Figure 3:
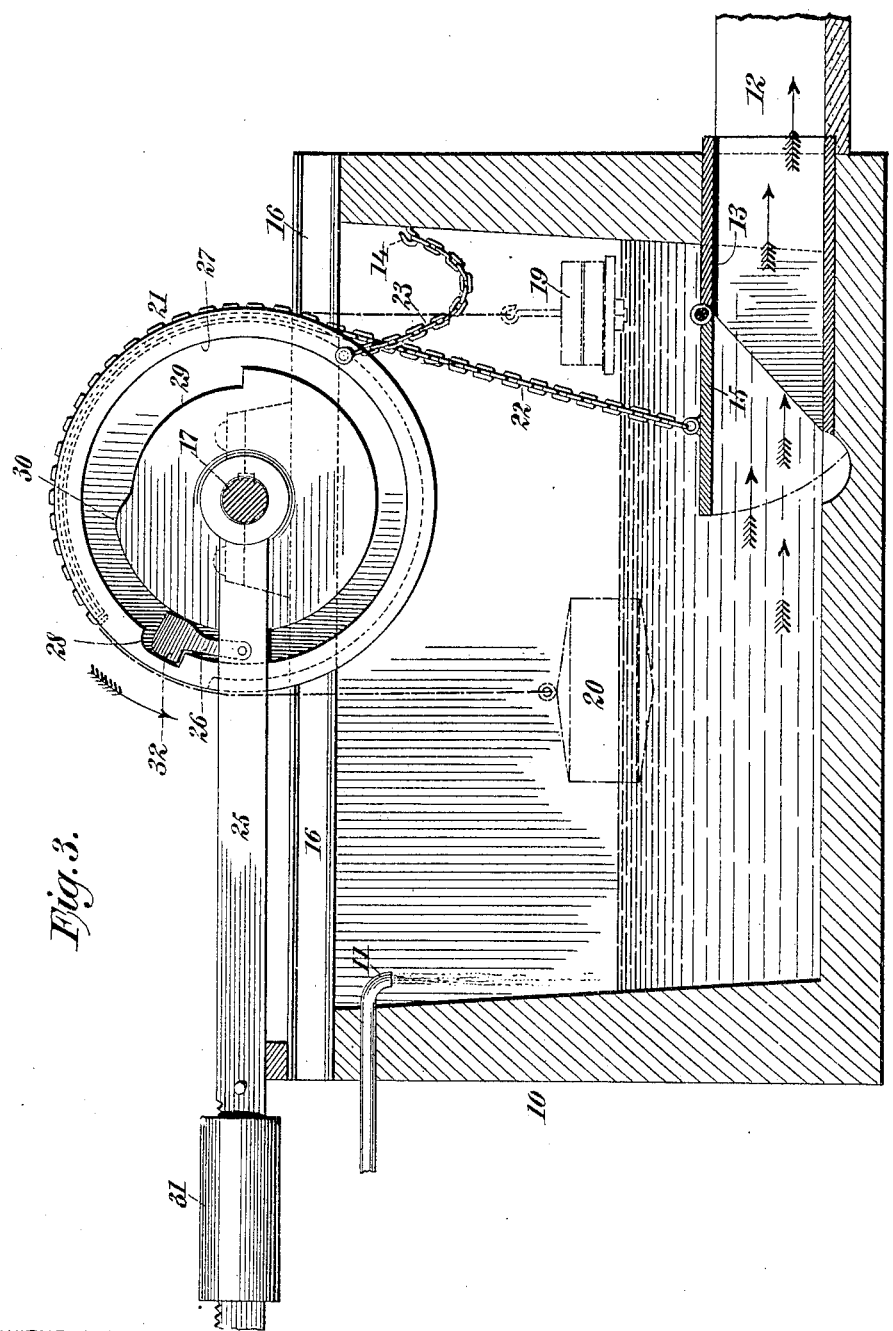

No. 871,820. PATENTED NOV. 26, 1907.
C. POTTS.
INTERMITTENT DISCHARGE TANK OR RESERVOIR.
APPLICATION FILED JUNE 24, 1907.
2 SHEETS—SHEET 1.
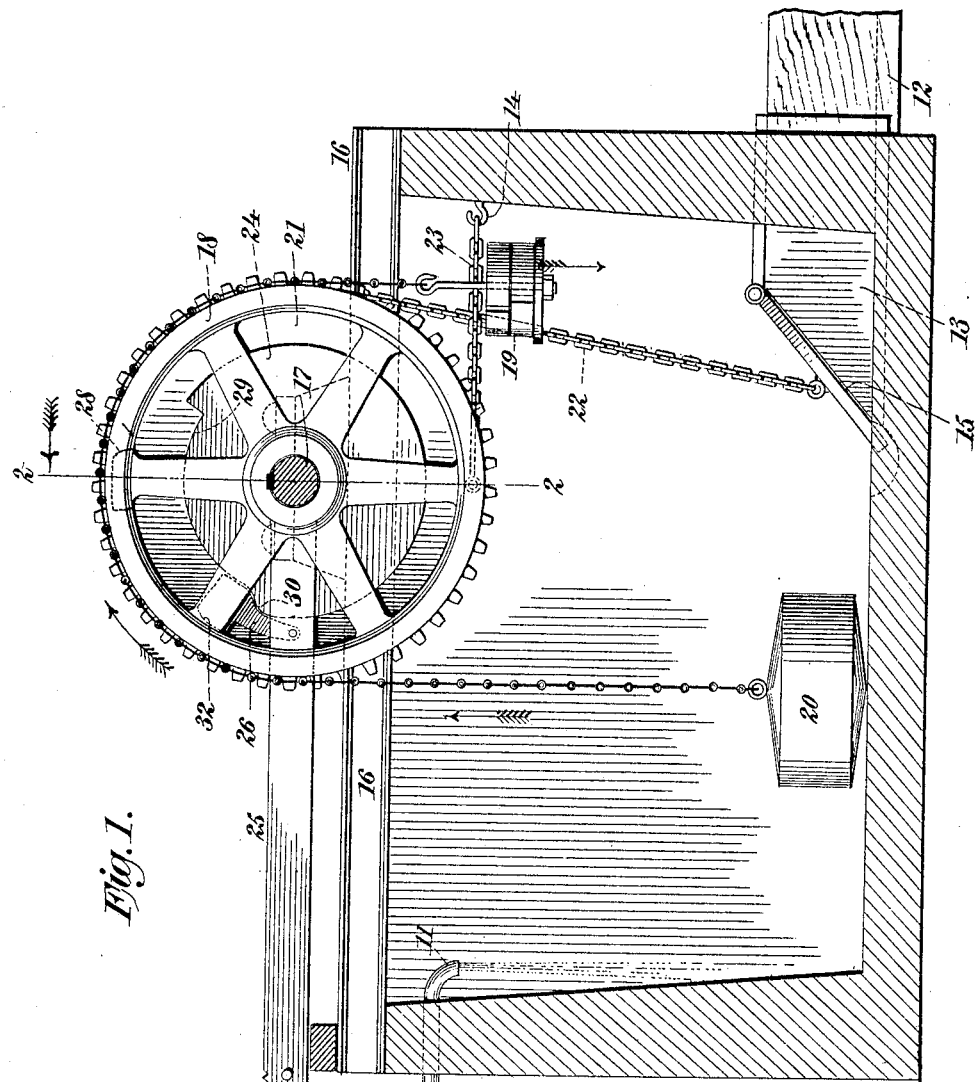
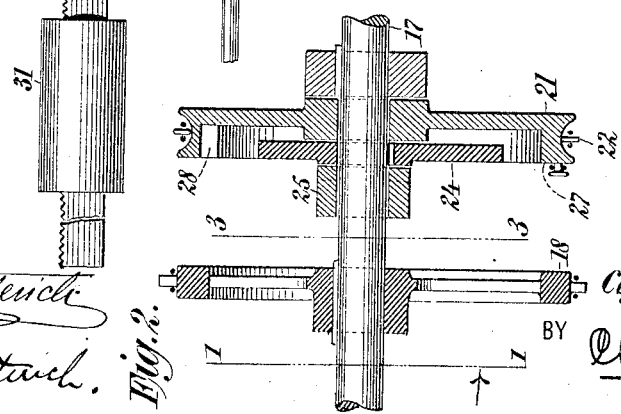
WITNESSES:
Gustave Dieterich
Edwin K. Dieterich
INVENTOR
Clyde Potts
BY
Chas. E. Gill
ATTORNEY No. 871,820. PATENTED NOV. 26, 1907.
C. POTTS.
INTERMITTENT DISCHARGE TANK OR RESERVOIR.
APPLICATION FILED JUNE 24, 1907.

2 SHEETS—SHEET 2.

WITNESSES:
Gustave Dietrich
Edwin N. Dietrich

INVENTOR
Clyde Potts
BY Chas. C. Gill
ATTORNEY

UNITED STATES PATENT OFFICE.

CLYDE POTTS, OF NEWARK, NEW JERSEY.

INTERMITTENT DISCHARGE TANK OR RESERVOIR.

No. 871,820.　　　　Specification of Letters Patent.　　　Patented Nov. 26, 1907

Application filed June 24, 1907. Serial No. 380,444.

*To all whom it may concern:*

Be it known that I, CLYDE POTTS, a citizen of the United States, and a resident of Newark, in the county of Essex and State of New Jersey, have invented certain new and useful Improvements in Intermittent Discharge Tanks or Reservoirs, of which the following is a specification.

The invention relates to improvements in intermittent flush-tanks and reservoirs for flushing sewers, dosing sewage onto filter-beds and analogous purposes, and it consists in the novel features, arrangements and combinations of parts hereinafter described and particularly pointed out in the claims.

The object of the invention is to provide a novel, easily constructed and applied and highly efficient mechanical apparatus, dispensing with the usual siphons, for insuring the automatic operation of intermittent flush-tanks and reservoirs at such intervals as may be desired, the tank or reservoir automatically discharging at regular intervals or whenever the liquid has accumulated therein to the predetermined extent.

The invention will be fully understood from the detailed description hereinafter presented, reference being had to the accompanying drawings, in which:

Figure 1 is a vertical longitudinal section through a tank or reservoir equipped with intermittent discharge apparatus embodying my invention, the parts being illustrated in their initial position and relation to one another with the discharge gate or valve in its closed position; Fig. 2 is a transverse section through a portion of the same on the dotted line 2—2 of Fig. 1, and Fig. 3 is a vertical longitudinal section, on the line 3—3 of Fig. 2, of the complete apparatus, the parts being shown in the position they occupy at the time the water has arisen to that predetermined level in the tank or reservoir which has resulted in the opening of the discharge gate or valve.

In the drawings 10 designates a tank or water-reservoir of usual form and construction, 11 the usual supply pipe leading thereto, 12 a portion of the trough leading to the filter-bed or sewer-pipe to be flushed, 13 a short chute or pipe-section connecting with said trough, and 15 a valve or gate for controlling the flow of water into said pipe-section and trough, said pipe-section extending through the side of and into said tank and being about flush with the bottom thereof, and said valve or gate being inclined and hinged at its upper edge to said section.

It is immaterial to my invention what the pipe-section 13 leads to, since my invention is confined to automatically-operating mechanical means controlled by the predetermined water-level in the tank or reservoir 10 for effecting the discharge of the water from said tank or reservoir through said pipe-section and permitting water to re-fill said tank or reservoir until it has attained said level preparatory to being discharged therefrom.

Across the top of the tank or reservoir 10 I mount on I-beam stringers 16 or other suitable supports, a shaft 17, which carries all of the mechanism embodying my invention and which comprises a sprocket-wheel 18 fast on said shaft, a sprocket chain hung at about its middle on said wheel and carrying on its respective depending ends a weight 19 and a float 20, a wheel 21 loose on said shaft, a chain 22 connecting said wheel with said valve or gate 15, a chain 23 connecting said wheel with a fixed point 14, a cam-disk 24 rigid on said shaft and set within the laterally flanged rim of said wheel, and a lever arm 25 swiveled freely on said shaft and weighted at its outer end and carrying a dog 26 adapted to lie between the edge of said cam and the rim of said wheel and travel with said cam during the filling of the tank or reservoir until a recess in the rim of said wheel is reached to receive a projecting portion of said dog, whereupon said dog engages said wheel, leaving said cam in its then position (Fig. 3), and through the weight of said arm rotates said wheel to open said valve or gate 15 to permit the discharge of the water from said tank or reservoir. During the discharge of the water the float descends with the level thereof and rotates the shaft 17 and cam 24 in a reverse direction and thereby returns said cam to its operative position with respect to the dog 26, which is then in its initial position, whereby the wheel 21 becomes released from the dog 26 and under the weight of the gate 15 returns to its initial position, allowing said gate to close, and whereby also upon the re-filling of the tank or reservoir said cam is enabled to again move said dog and arm upwardly until the projection on the dog again enters the notch in the rim of the wheel 21 and effects through the weight of said arm the opening of the gate 15.

The sprocket wheel 18 and chain thereon require no specific description.

The float 20 will ride upon the water filling into or leaving the tank or reservoir 10, and the weight 19 will preferably be in sections so as to be capable of adjustment to the weight of said float. When the float 20 is carried upwardly on and by the water filling the tank or reservoir, the weight 19 will descend and the sprocket wheel 18 rotate in a direction toward said weight and impart its movement to the shaft 17, and when the water is discharging from the tank or reservoir 10 the float 20 will descend and the weight 19 ascend and the wheel 18 and shaft 17 be thereby rotated in a reverse direction or toward said float.

The wheel 21, free on the shaft 17, is in the form of a flat disk having a peripheral rim 27 extending laterally on one side thereof, the inner surface of said rim defining a circle except at one point at which said rim is formed with an outwardly projecting recess or notch 28.

The cam 24, fast on the shaft 17, is in the form of a disk recessed along a portion of its edge, as at 29, and having at one end of said recess a cam-shoulder 30. The cam 24 is within the vertical plane of the rim 27 of the wheel 21. The lever-arm 25 is at its inner end swiveled freely on the shaft 17 adjacent to the cam 24, and at its outer end said arm is provided with a weight 31, which for convenience I prefer to make adjustable. The outer end of the arm 25 may when in its lower position rest upon the edge of the reservoir or any support placed to receive it. The lever-arm 25 has pivoted to it the dog 26, which is confined within the space between the outer edge of the cam 24 and inner edge of the wheel-rim 27. The upper end of the dog 26 is enlarged to form a projecting head 32 to be engaged by the shoulder 30 of the cam 24 during the upward movement of said shoulder and then upon reaching the notch 28 of the wheel-rim 27 to enter the same and thereby engage and turn the wheel 21 under the weight of the arm 25 then left free to descend or turn downwardly to its initial at rest position. During that rotation of the cam 24 to carry its shoulder 30 upwardly, which is during the filling of the reservoir and the ascent of the float 20, said shoulder cannot pass by the dog 26 until it has lifted said dog and the arm 25 connected with it sufficiently for the dog to reach the notch 28, at which time the shoulder 30 continuing to press against the dog will move the head of the latter into said notch and thereby become freed from it, under which condition the dog and arm become engaged with the wheel 21 and will at once return to their initial position, leaving the cam 24 and causing the wheel 21 to follow them (Fig. 3), said wheel during this movement pulling on the chain 22 and opening the discharge gate or valve 15. The wheel 21 will remain locked to the dog 26 and arm 25, as shown in Fig. 3, until owing to the discharge of the water from the reservoir, the float 20 has descended sufficiently to turn the cam 24 backwardly to its initial position, the shoulder 30 passing the dog 26 while the latter is still partly within the notch 28, whereupon the recess 29 of said cam will admit the head of the dog and the weight of the gate or valve 15 and chain 22 will at once act to reverse the movement of said wheel 21, said gate closing that the reservoir may be refilled and said wheel 21 being stopped at its initial position (Fig. 1) by the chain 23, which is of just the correct length for that purpose.

The initial position of the parts of the mechanism is illustrated in Fig. 1, the gate 15 being closed, the tank or reservoir substantially empty, the float 20 in its lower position, the weight 19 in its upper position and the outer end of the arm 25 resting upon its support. As the water fills within the receptacle 10 the float 20 ascends and the weight 19 descends and turns the shaft 17 and sprocket wheel 18 toward the right, looking at Fig. 1, or in the direction of the arrow shown. The rotation toward the right of the shaft 17 results in the cam 24 having a corresponding motion, and this cam (during the filling of the reservoir) acting on and through the dog 26 turns the arm 25 upwardly, said arm and dog gradually moving upwardly until the head of the latter reaches the notch 28, indicated by dotted lines in Fig. 1, whereupon the head of said dog will enter said notch 28 and thereby engage the wheel 21. Upon the engagement of the dog 26 with the wheel 21 the weight of the projecting arm 25, aided whenever necessary by an additional weight 31, will pull the wheel 21 in the direction of the arrow shown in Fig. 3, the arm 21 and dog 26 descending to their initial position (leaving the projection 30 of the cam 24 in its upper position) and holding the wheel 21 in opposition to the weight of the then open gate or valve 15 and chain 22, as shown in Fig. 3.

The descent of the arm 25 and its movement of the wheel 21, through the dog 26, to the position shown in Fig. 3, takes place when the water has attained the predetermined level in the reservoir 10 and effects the opening of the gate or valve 15. The outflow of the water from the reservoir 10 results in the float 20 descending and the weight 19 ascending, and this operates to reverse the movement of the sprocket wheel 18, shaft 17 and cam 24, this reverse movement continuing until the float has attained its lower position shown in Fig. 1 and the shoulder 30 on the cam 24 has passed downwardly below the head of the dog 26, at which time, space for the head of the dog will be afforded by the recess 29 of said cam and the weight of the chain 22 and gate or valve 15 will at once operate to restore the wheel 21 to the position shown in Fig. 1, said gate or valve closing and said chain turning the wheel 21 toward the right, looking at Fig. 1, until the notch 28 is at the upper edge of the wheel. The movement of the wheel 21 toward the right is limited by the length of the chain 23, and the length of the chain 23 will vary with the quantity of water to enter the reservoir for each discharge. I indicate by a dotted line the water level in the reservoir, this level being a predetermined one for the length of chain 23 shown and the initial position of the notch 28 of the wheel 21. If it should be desired to arrange the mechanism so as to effect the discharge of the water at a lower predetermined level than that indicated, it would simply be necessary to shorten the chain 23, that is engage the third or fourth link of the chain, for illustration, on the hook 14, in lieu of permitting the first link of said chain to remain on said hook. The shortening of the chain 23 would result in the wheel 21 having an initial position with the notch or recess 28 nearer to the dog 26 than that shown in Fig. 1, and the effect of this would be that during the filling of the reservoir with water and the ascent of the float 20, said dog would be caused to enter said notch or recess and effect through the descent of the arm 25 the rotation of the wheel 21 to open the gate or valve 15 at a period in advance of that at which said gate or valve would be opened if the predetermined initial position of the notch or recess 28 were that shown in Fig. 1 or at a greater distance from the dog 26. By adjusting the length of the chain 23 so as to give the notch or recess 28 an initial position nearer to the initial position of the dog 26, the discharges from the reservoir will take place more frequently with less water in each discharge, and by regulating the length of the chain 23 so as to locate the initial position of the notch or recess 28 at a greater distance from the initial position of the dog 26, the discharge from the reservoir will be less frequent and in greater quantity.

My invention dispenses entirely with the use of siphons for effecting the intermittent discharge of water from flush tanks and reservoirs and provides simple mechanical devices for regulating and controlling such discharge. In the employment of the siphons a definite head of water is left in the bottom of the tank or reservoir at each discharge, while with the mechanism presented herein the tank or reservoir may be substantially emptied at each discharge.

I do not limit the invention exclusively to use for flushing purposes, since the tank or reservoir has an automatic periodical predetermined discharge and may be employed for any purpose for which it may be applicable. The level of the water or other liquid within the tank or reservoir will determine the moment of discharge and the period between the discharges may be regulated by the inflow to the tank or reservoir. I propose to use the invention as means for periodically flushing sewers and dosing sewage onto filter beds, but it is applicable for other purposes.

I do not limit the invention to the special details and forms of parts shown, since obviously the mechanism admits of variations within the scope of my invention.

What I claim as my invention and desire to secure by Letters Patent, is:

1. An intermittent discharge-tank or reservoir having an inlet, a discharge at its lower end and a valve for said discharge, combined with an automatic mechanism for operating said valve comprising a shaft, a rotary member thereon having suspended from one side thereof a weight and from the other side a float, a rotary member free on said shaft, means for limiting its movement in one direction, means connecting said free rotary member with said valve so that it may open the same on one of its movements, a cam fast on said shaft, and an arm carrying a dog to be engaged by said cam during the filling of the tank and to thereafter engage said free rotary member and effect the movement of the same for opening said valve; substantially as set forth.

2. An intermittent discharge-tank or reservoir having an inlet, a discharge at its lower end and a valve for said discharge, combined with an automatic mechanism for operating said valve comprising a shaft, a sprocket wheel rigid thereon having upon it a chain carrying on its respective depending ends a weight and a float, a rotary member free on said shaft, means for limiting its movement in one direction, means connecting said free rotary member with said valve so that it may open the same on one of its movements, a cam fast on said shaft, and an arm carrying a dog to be engaged by said cam during the filling of the tank and to thereafter engage said free rotary member and effect the movement of the same for opening said valve; substantially as set forth.

3. An intermittent discharge-tank or reservoir having an inlet, a discharge at its lower end and a valve for said discharge, combined with an automatic mechanism for operating said valve comprising a shaft, a rotary member thereon having suspended from one side thereof a weight and from the other side a float, a wheel free on said shaft and having a laterally extending rim provided at a definite point with a recess, means for limiting the movement of said wheel in one direction, means connecting said wheel with said valve so that it may open the same on one of its movements, a cam fast on said shaft and set within said wheel-rim and having a recess along a portion of its periphery with a shoulder at the end thereof, and an arm carrying a dog having a head disposed between the said rim and said cam and to be engaged by said shoulder during the filling of the tank and to thereafter enter said recess and engage said wheel and effect the movement of the latter in a direction to open said valve; substantially as set forth.

4. An intermittent discharge-tank or reservoir having an inlet, a discharge at its lower end and a valve for said discharge, combined with an automatic mechanism for operating said valve comprising a shaft, a rotary member thereon having suspended from one side thereof a weight and from the other side a float, a wheel free on said shaft and having a laterally extending rim provided at a definite point with a recess, means for limiting the movement of said wheel in one direction, means connecting said wheel with said valve so that it may open the same on one of its movements, a cam fast on said shaft and set within said wheel-rim and having a recess along a portion of its periphery with a shoulder at the end thereof, and an arm swiveled on said shaft and projecting outwardly therefrom to create a weight and carrying a dog having a head disposed between the said rim and said cam and to be engaged by said shoulder during the filling of the tank and to thereafter enter said recess and engage said wheel and effect the movement of the latter in a direction to open said valve; substantially as set forth.

Signed at New York city, in the county of New York, and State of New York, this 20th day of June A. D. 1907.

CLYDE POTTS.

Witnesses:
ARTHUR MARION,
CHAS. C. GILL.